R. RATHBONE.
Improvement in Wool-Driers.
No. 148,985. Patented March 24, 1874.
2 Sheets--Sheet 1.
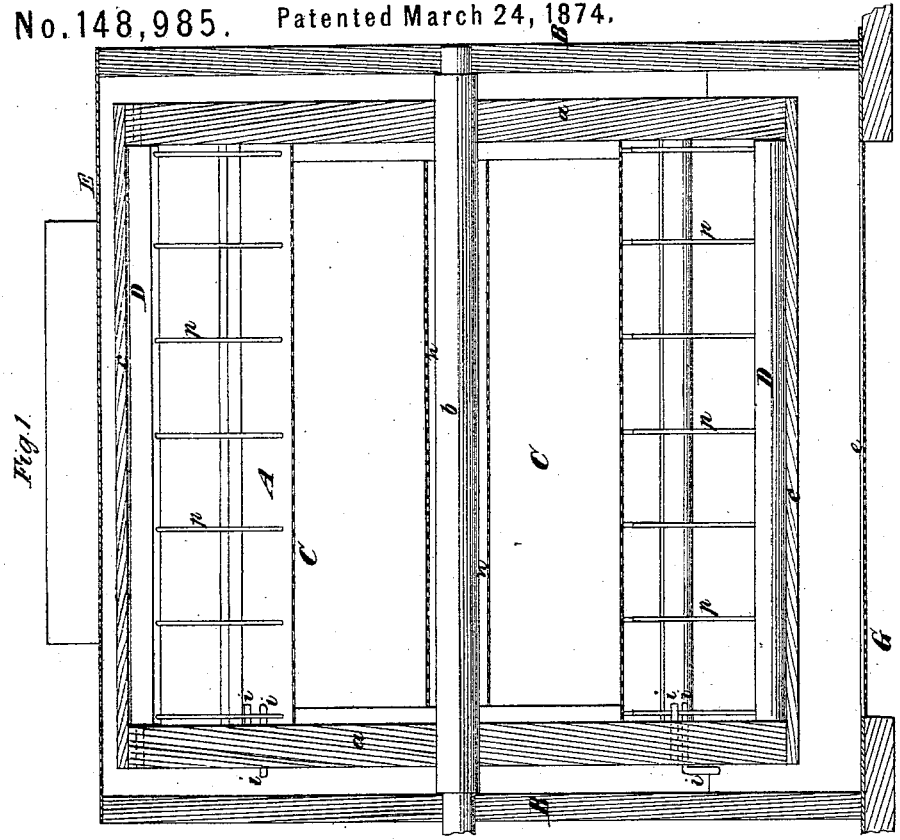
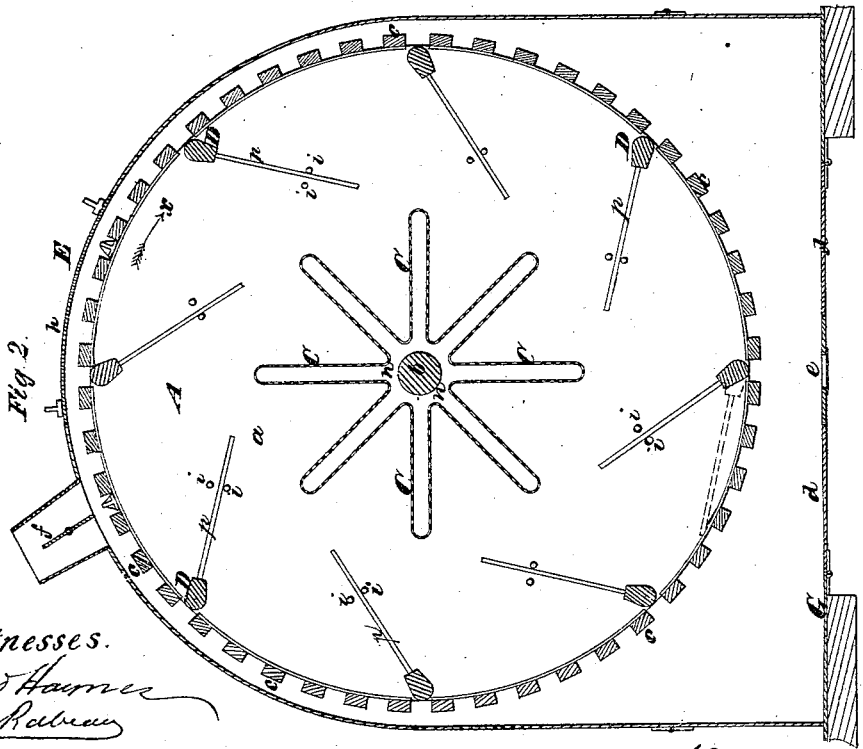
Witnesses.
Fred Haynes
R. J. Rathbone
Ransom Rathbone 2 Sheets--Sheet 2.
R. RATHBONE.
Improvement in Wool-Driers.
No. 148,985. Patented March 24, 1874.
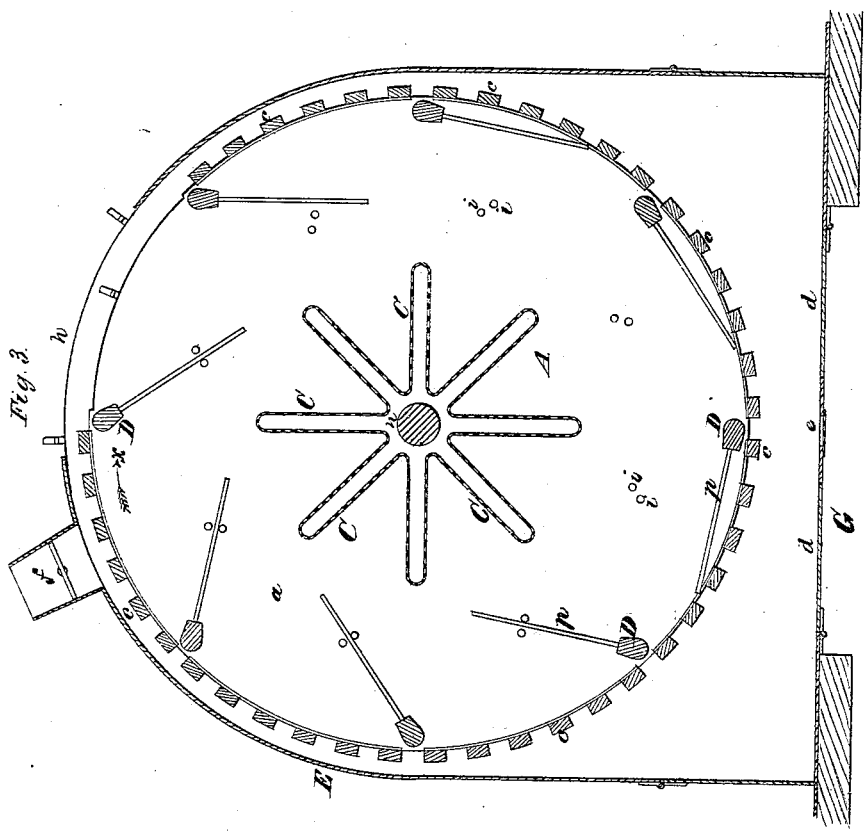
Witnesses:
Fred Haynes
R. R. Raben
Ransom Rathbone.

UNITED STATES PATENT OFFICE.

RANSOM RATHBONE, OF NEW YORK, N. Y.

IMPROVEMENT IN WOOL-DRIERS.

Specification forming part of Letters Patent No. 148,985, dated March 24, 1874; application filed February 7, 1874.

*To all whom it may concern:*

Be it known that I, RANSOM RATHBONE, of the city, county, and State of New York, have invented an Apparatus for Drying Wool, &c., of which the following is a specification:

This invention consists in a slatted cylinder or cage, having within it a novel system or arrangement of racks, by which the wool or other substance to be dried is prevented from becoming concentrated, or all accumulating in one part of the cylinder or cage, and is dropped from one rack to another, and thereby not only kept in a loose condition, but turned over and over so that all parts of it will be presented to the action of currents of air which are caused to circulate through the cylinder for the purpose of absorbing and carrying off the moisture.

In the accompanying drawing, Figure 1 is a longitudinal section of the apparatus. Fig. 2 is a transverse section of the same with the racks arranged for operation; and Fig. 3 is a similar section, showing the racks as disposed while the apparatus is being loaded.

Similar letters of reference indicate corresponding parts in all the figures.

A is the slatted cylinder or cage. It is composed of two circular end pieces, $a\ a$, secured to a shaft, $b$, and of a series of slats, $c\ c$, which are secured at their ends to the edges of the end pieces $a\ a$, and form the periphery of the cylinder. The whole of these slats, or any portion of them, may be secured into removable sections to facilitate the loading of the cylinder. The shaft of the cylinder A is supported in bearings in standards B B, erected on the floor of the room in which the apparatus is situated, or on any other support. In the middle of the cylinder surrounding its shaft $b$ there are a series of hollow racks, C C, of reticulated or perforated material arranged radially to the center of the shaft, and uniting to form a central space, $n$, around the shaft, into and through which chamber portions of the ascending air passes, the same entering and escaping through the perforations in the racks C, whereby the material temporarily resting or lodging on the racks is acted upon by the air. These racks are rigidly secured in place, their ends being connected to the head or end pieces $a\ a$, so that they revolve with the cylinder or cage. $D\ p\ D\ p$ are a series of racks, which are arranged in the cylinder near its periphery. They consist of long bars D, having series of prongs or teeth, $p$, projecting from them at intervals throughout their length. The bars of these racks are pivoted to the ends of the cylinder, and pairs of pins $i\ i$, in one of the ends of the cylinder, are arranged to project one on each side of the adjacent tooth of each rack to secure the latter in position at an inward inclination from the periphery of the cylinder. One of each pair of these pins is removable from the outside of the cylinder to permit the necessary movement of the rack. Instead of one of the removable pins a cord fastened to the rack and operated from the exterior of the cylinder, may be used to secure the racks in position against the fixed pin. E is a hood, which covers the cylinder and its standards. It is furnished with a hinged lid, $h$, to provide for filling the cylinder, and is also provided with an opening, $f$, governed by a damper for the outlet of the air-blast.

Generally the apparatus will occupy a whole floor in height, and will be filled from a floor above, and will discharge into a floor below. For this reason the floor, which is represented by G, is provided with a discharging-trap, $d$, and, for the admission of the current of air to and through the cylinder, it is also provided with an opening, $e$, protected by a wire-gauze screen.

The operation is as follows: The lid of the hood E is first opened, and the removable sections, or any number of them composing the periphery of the cylinder A, are taken off. The removable pin of each pair $i\ i$ is then withdrawn sufficiently to release the rack, which it controls, and then all the racks $D\ p\ D\ p$ are swung back to the position shown in Fig. 3, and the wool or other substance to be dried is introduced into the cylinder. The racks $D\ p\ D\ p$ are then swung in position, as shown in Fig. 1, and secured by their locking-pins, and the movable sections of the periphery of the cylinder are put on and secured. The cylinder is then rotated by any suitable means in the direction of the arrow $x$, and by its own gravity the wool or other substance to be dried is dropped from the faces of the tangential racks D $p$ D $p$ to the backs of the radial racks C C, thence to the backs of the racks D $p$ D $p$, and from them to the faces of the radial racks C C. By thus being dropped from rack to rack the wool is tossed about and turned over and over in small quantities, and is prevented from accumulating in a body either around the shaft or in any part of the cylinder, and is very effectually and thoroughly presented to the action of the air-blast, which is continually passing from the opening in the floor through the slatted periphery of the cylinder, and out of the opening of the hood.

I claim—

1. The series of racks D $p$, pivoted upon the interior of the slatted cylinder or cage A, in combination with devices $i$ $i$ for supporting, holding, and releasing the racks, in the manner substantially as described, for the purpose specified.

2. The racks C C, each radiating from a central chamber, $u$, and fixed at their ends upon the heads $a$ $a$ of the cage, in combination with pivoted racks secured upon the inner surface of the cage, to operate substantially in the manner herein shown and described, for the purpose set forth.

RANSOM RATHBONE.

Witnesses:
 FRED. HAYNES,
 R. E. RABEAU.